Figure 1:
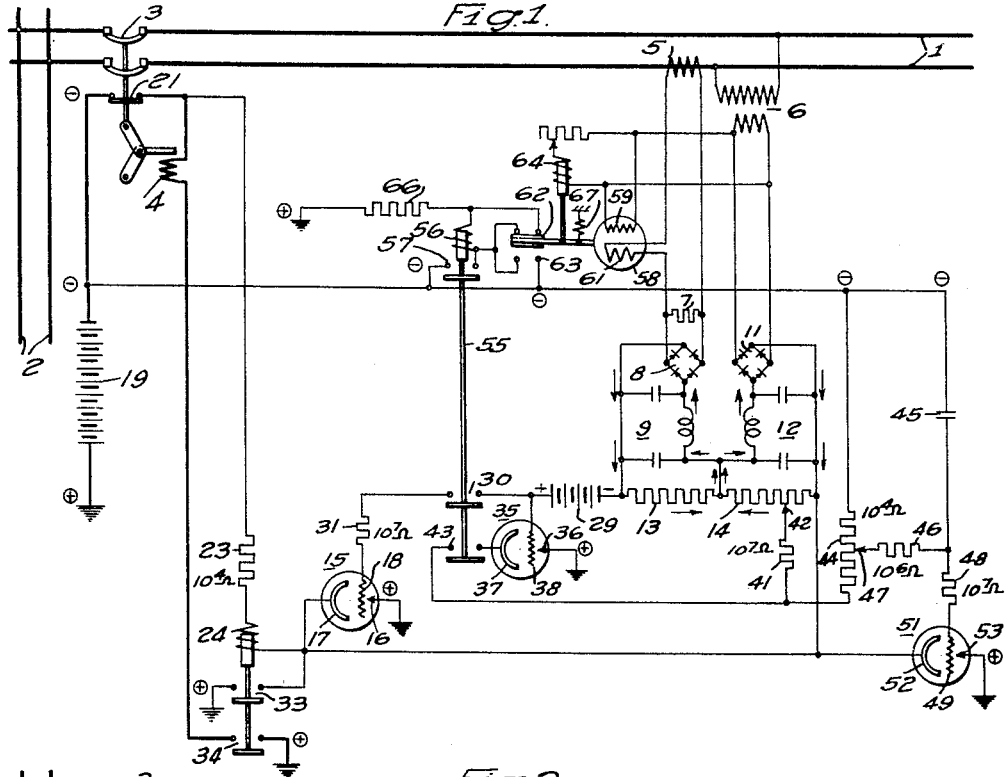

Jan. 7, 1936.    S. L. GOLDSBOROUGH    2,027,226
IMPEDANCE RELAY SYSTEM
Filed July 26, 1933

WITNESSES:

INVENTOR
Shirley L. Goldsborough
BY O. B. Buchanan
ATTORNEY

Patented Jan. 7, 1936

2,027,226

UNITED STATES PATENT OFFICE 2,027,226

IMPEDANCE RELAY SYSTEM

Shirley L. Goldsborough, East Orange, N. J., assignor to Westinghouse Electric & Manufacturing Company, East Pittsburgh, Pa., a corporation of Pennsylvania Application July 26, 1933, Serial No. 682,255

20 Claims. (Cl. 175—294)

My invention relates to impedance relay systems and particularly to systems for controlling the operation of electron tubes for the protection of a transmission line against faults occurring thereon.

The advantages of tubes over mechanical or moving-part relays have been long recognized, in respect to their generally lower volt-ampere requirements and their generally quicker time of response. The application of such tubes to the various relaying functions which have heretofore been commonly performed by mechanical apparatus is attendant with considerable difficulties, some of which it is my present purpose to circumvent. The application of such tube relays to respond in a simple manner to current or voltage has been proposed heretofore, but the more complicated function of responding to a quotient or a difference, as in an impedance relay, involves special difficulties which have had to be overcome.

My present invention relates, therefore, to means, systems, and methods for overcoming the above-mentioned difficulties and for providing a control circuit or network which is particularly adapted for the control of three-element electron tubes or other sensitive instantaneously responsive apparatus.

One of the difficulties to be overcome in the utilization of a tube to respond to a quotient or difference between two electrical quantities is that the tube responds to a comparison of instantaneous values of the quantities, so that these quantities must, at least one of them, be unidirectional quantities, and not only unidirectional but substantially non-pulsatory, because it is impossible to control the relative phases of current and voltage, in an alternating-current system, so as to control the relative phases of the pulsations of the rectified currents and voltages which may be derived therefrom. When my invention is utilized in connection with an alternating-current system, therefore, I preferably utilize rectified currents and voltages derived from the line and I also utilize means for smoothing out the pulsations of one or both of these rectified quantities.

The smoothing-out means may be either a filter or a split-phase rectifier circuit, or any equivalent device. Such devices have the property of somewhat retarding the rate of response of the electron tube relay apparatus; but even at that, the rate of response is still as fast as, or faster than, the fastest rate of response of a mechanical type of impedance relay, and the rate of response is always substantially constant, thereby avoiding the very disadvantageous characteristic of the mechanical relay of requiring rather too long a time to respond to faults which are close to the balance point of the relay. The balance point of an impedance relay is the point on the transmission line at which a fault must be located so that the quotient or difference of line-voltage and line-current is exactly balanced in the relay, so that a slight increase in current or decrease in voltage will cause the relay to operate, and a slight change in the reverse direction will cause the relay to fail to operate.

The slight hesitation or time delay introduced by the pulsation-smoothing means is advantageous also in avoiding impulsive operation of my tube relays in response to lighting impulses or switching surges on the line, thus safeguarding against faulty operations which might be obtained if the action were more instantaneous. In speaking of time-delays here, I am not speaking of any material amount of time, but only such time as is necessary to integrate the alternating-current quantity in question over a cycle or a sufficiently large fraction of a cycle to distinguish from instantaneous values of the quantity.

In order to avoid the difficulties which have been experienced with mechanical relays in regard to fluttering contacts, I prefer to utilize a type of three-element or grid-controlled electron tube in which the anode-cathode circuit is broken down by the application of a critical control-voltage to the grid or control electrode, the characteristic of the tube being such, however, that, once the anode-cathode circuit is established, the current continues to flow independently of the control of the grid. There are a number of such tubes on the market. I prefer to utilize, for this purpose, a grid-glow tube which is a three-electrode tube having a cold cathode of relatively large area, usually a cylinder, an anode of restricted area, usually a wire within the cylinder, and a grid or control electrode which is usually not in the form of a grid at all but is any electrode disposed within the tube and usually located quite close to the anode, the term "grid" applying to its function rather than its structure, the whole being enclosed in an envelope filled with neon at a pressure of about one one-hundredth of an atmosphere. Such a tube operates on the principle of ionization of the neon gas when a sufficient voltage is applied between the various electrodes, such ionization producing a glow discharge which is initiated when a sufficient voltage is applied between the grid and the cathode, the ionization thereafter spreading over to the anode and breaking down the space between the anode and the cathode, provided that a sufficiently high anode voltage is utilized in the plate circuit or anode-cathode circuit.

With the foregoing and other objects in view, my invention consists in the apparatus, systems, and methods hereinafter described and claimed and illustrated in the accompanying drawing, the two figures of which are diagrammatic views of circuits and apparatus embodying my invention in two different forms of embodiment, by way of illustration of the general principles involved.

In Fig. 1 I have shown my invention in an alternating-current system comprising a transmission line 1, which is energized from a station bus 2, and which is supplied with a circuit-interrupter or circuit-breaker 3 which is adapted to be tripped or opened by the energization of the usual trip coil 4.

According to my invention, relaying current and voltage are derived from the transmission line 1 through current and potential transformers 5 and 6, respectively. The current from the current transformer is passed through a resistance or other impedance 7, across which is connected some sort of rectifying circuit, which is illustrated as comprising a bridge or network 8 of rectifiers such as copper-oxide rectifiers, or any other suitable rectifying equipment. The resistor 7 in the current-transformer circuit acts as a source of voltage which varies in accordance with the line-current, and this source of voltage is utilized to generate corresponding rectified currents which are delivered by the rectifier bridge 8 and which are then filtered in any suitable filter arrangement 9 whereby substantially non-pulsatory rectified currents are produced.

In like manner, the relaying voltage which is delivered by the potential transformer 6 is applied to a rectifier network 11 in which the current is rectified, after which the current passes through another filter arrangement 12 for smoothing out the pulsations.

The rectified non-pulsatory currents which are delivered by the filters 9 and 12 are passed through two resistors 13 and 14 which are connected together in series with each other. The rectified currents are passed in opposite directions, however, so that the voltage-drops, or voltages appearing in the two resistors 13 and 14, are in opposite directions. These voltage-drops are so chosen and adjusted that the resultant differential voltage appearing across the outside terminals of the two resistors 13 and 14 is zero at the balance point of the relay, or the point beyond which the relay is not expected to operate.

According to my invention I utilize this resultant differential direct-current voltage, appearing across the outside terminals of the resistors 13 and 14, as a means for actuating any kind of electro-responsive device which is responsive to the direction or polarity of the resultant voltage, so as to respond when the line-current-responsive voltage in the resistor 13 exceeds the line-voltage-responsive voltage in the resistor 14, but not when the two voltages are equal or when the line-voltage-responsive voltage is the larger. The "response" of this electro-responsive device is that action which is desired of the device: said action may be either a picking up of its armature or a dropping of its armature, or the making of a circuit or the breaking of a circuit, or any other desired operation, as will be well understood.

The means which I have illustrated for differentially responding to the direct-current voltages appearing in the resistors 13 and 14 comprises a three-element electron tube of the glow-discharge type, commonly known as a grid-glow tube, indicated by the numeral 15. It is provided with an anode 16, a cathode 17, and a grid or control electrode 18, as previously described. It is supplied with a plate-voltage source which is shown as being the same as the battery 19 which is utilized as a source of energy for the trip coil 4 of the circuit breaker 3. The positive terminal (+) of the battery 19 is connected to the anode 16 of the tube 15, and the negative terminal (−) of the battery is connected, through auxiliary circuit-breaker contacts 21, a current-limiting resistor 23, and a relay-coil 24, to the cathode 17 of the tube 15. The cathode 17 of the tube is also connected to the free end of the resistor 14 in which the line-voltage-responsive direct-current voltage is developed. The free end of the other resistor 13, in which the line-current-responsive direct-current voltage is developed, is connected to the negative terminal of a grid-biasing battery 29, the positive terminal of which is connected, through a relay-contact 30 and a current-limiting resistor 31, to the grid 18 of the tube 15.

A glow-discharge is initiated inside of the tube 15 by means of ionization by collision within the gas, permitting a passage of current, with a drop of potential across the tube of approximately 180 volts which is practically independent of the current. The function of the grid 18 is to control the potential at which the anode current begins. The grid 18 may be either positive or negative with respect to the anode 16. If the grid is negative with respect to the anode, that is, if the grid-cathode voltage is less than the anode-cathode voltage, prior to the initiation of the glow discharge, the starting potential necessary to be applied between the anode 16 and the cathode 17 is very high. On the other hand, if the grid 18 is positive with respect to the anode 16, the plate voltage necessary to be applied to the anode-cathode circuit is lower.

It will thus be seen that, when the plate-voltage is constant, as in the connection just described, said voltage being the voltage of the tripping battery 19, the tube will break down, or start its glow-discharge, only if the potential applied to the grid exceeds a certain critical value, the grid 18 being always positive with respect to the cathode 17. If the grid-bias or potential is less than this critical value, the glow-discharge will not start in the tube. If the grid-bias exceeds this critical value, even as a result of a very short surge of voltage, a glow-discharge will start between the grid and the cathode and thence spread to the space between the anode and the cathode, so that the tube will begin carrying current in its plate-circuit, or anode-cathode circuit. Once the discharge is started, the grid has no appreciable effect in controlling the current, the magnitude of the current being determined solely by the resistance of the external circuit. The grid will regain control, however, if the anode current is interrupted even for a very short time.

In accordance with the foregoing principles, therefore, the operation of my biasing battery 29 is so chosen that the tube 15 is almost, but not quite, ready to break down; that is, the biasing battery voltage is such that the potential between the grid 18 and the cathode 17 is not quite equal to the critical biasing voltage necessary to initiate the discharge, for the particular plate-voltage (battery 19) which is utilized. My design is also so arranged that the line-voltage-responsive direct-current voltage which is developed in the resistor 14 always operates with the effect of tending to prevent the tube-discharge from initiating, that is, this direct-current voltage always reduces the grid-voltage by an amount which is responsive to the line-voltage of the alternating-current line 1. The line-current-responsive direct-current voltage which is developed in the resistor 13 tends to increase the direct-current potential existing between the grid 18 and the cathode 17, so that it tends to initiate the discharge of the tube.

The design is such that, at the balance point of the relay, that is, at conditions corresponding to a fault so located on the line 1, that if it were any further away the relay would not respond and if it were any nearer the relay would respond, the direct-current voltages developed in the resistors 13 and 14 will be substantially equal and opposite to each other, so that the resultant differential voltage applied to the grid circuit of the tube, by the resistors 13 and 14, will be substantially zero, the grid having, under such circumstances, a potential determined by the biasing battery 29 which is less than the critical potential necessary to cause the tube to break down and start its discharge between the anode and the cathode.

It will be understood that when a fault occurs on the transmission line 1, the line-current will, in general, be larger than the maximum normal load current, and the line voltage will always be reduced, approximately zero if the fault is right at the relay, and increasing in value for faults more and more remote from the relay. Since the line is practically short-circuited by the fault, at the point of fault, wherever that is, the impedance relay thus responds to the drop in voltage which appears across the impedance of the line from the relaying point to the point of fault, at the current which is prevailing at the instant in the line. In this way the impedance relay responds to the distance of the fault from the relaying point.

Under normal transmission-line conditions, when there is no fault on the system, the restraining influence of the line-voltage-responsive part of the impedance relay will be sufficient to restrain the relay from response at even the highest normal load currents.

Since the grid-glow tube 15 operates in response to a decrease in the value of the line-voltage-responsive grid-circuit voltage developed in the resistor 14, or to an increase in the line-current responsive grid-circuit voltage developed in the resistor 13, it is necessary that the restraint imposed by the line-voltage-responsive grid-circuit voltage of the resistor 14 shall never drop to zero, unless, of course, the line-current-responsive grid-circuit voltage of the resistor 13 is also zero at the same instant. Since the phase relations between line-current and line-voltage are quite variable and out of the control of the relay circuits, no reliance can be placed upon the relative phases of current and voltage. Hence it is necessary, most particularly in the case of the line-voltage-responsive grid-circuit voltage of the resistor 14, that this grid-circuit voltage shall be not only unidirectional, but also substantially non-pulsatory in character; that is, the pulsations resulting from the rectification of the alternating line-voltage must be smoothed out.

If the line-voltage-responsive grid-circuit voltage of the resistor 14 is non-pulsatory, it is not so essential that the line-current-responsive grid-circuit voltage of the resistor 13 shall be absolutely non-pulsatory, or even that it shall be unidirectional, because the action of the grid-glow tube depends only upon the maximum instantaneous value which this voltage has, in the direction which is opposite to the line-voltage-responsive direct-current voltage in the other resistor 14. Whether the line-current-responsive direct-current voltage of the resistor 13 is non-pulsatory or not, the setting of the relay is adjusted so that the steady or non-pulsatory line-voltage-responsive direct-current voltage of the resistor 14 substantially neutralizes the maximum or greatest value of the line-current-responsive grid-circuit voltage of the resistor 13, for conditions corresponding to a fault out on the line at the balance point of the relay.

I believe that it is advantageous to rectify the line-current as well as the line-voltage, and also to smooth out the pulsations of the rectified line-current, so that I know that I am dealing with substantially steady direct-current values which are relatively unaffected by the changes in the wave form of the alternating current of the line. The rectifying means and pulsation-quenching means are quite useful, also, in avoiding erroneous operation of the relay in response to impulsive disturbances on the transmission line, as in the case of a lightning flash or a momentary switching surge.

When a glow discharge is initiated in the grid-glow tube 15, the resulting plate-current in the anode-cathode circuit of the tube energizes the relay-coil 24 and causes this relay to pick up, thus closing two relay-contacts 33 and 34. The relay-contact 33 by-passes the tube 15, thus extinguishing the tube and providing a holding circuit for temporarily maintaining the energization of the relay-coil 24. The relay-contact 34 provides a tripping circuit through the tripping coil 4 of the circuit-breaker 3, thereby disconnecting the line 1 from the bus 2. When the circuit-breaker 3 opens, it opens its auxiliary contact 21, which interrupts both the tripping-coil circuit and the circuit of the relay-coil 24.

The action of the grid-glow tube 15 and the tripping-function resulting therefrom are both instantaneous or quick-acting in the sense that there is no deliberate time-delay introduced for the purpose of differentiating between near and far faults, or for the purpose of permitting a circuit-breaker which might be closer to the fault than the circuit-breaker which is controlled by the tube to operate first. The time-delays which are introduced by the rectifying and filtering means are of the order of a fraction of a cycle of the frequency of the line, which may be a 60-cycle line, and these time-delays are only of the order of magnitude necessary to secure an integration or averaging of the alternating current and voltage wave-forms so as to respond to integrated or average or effective values rather than instantaneous values.

It is common, in impedance-relay installations, to follow up the first impedance relay protection, such as that which has just been described, with a second impedance-relay element, which responds to faults further out on the line, and which is associated with a definite time-delay means for delaying the tripping of the circuit-breaker until there has been given a chance for the fault to be first cleared from the line by means of some other circuit-breaker and relaying-apparatus which may be disposed closer to the fault, particularly in the case of a sectionalized line having a plurality of line-sections connected in series with each other.

In my present invention, this second impedance-relay element is provided for, in the shape of a second grid-glow tube 35 which is similar to the tube 15 previously described, and which is provided with an anode 36, a cathode 37, and a grid 38. The grid 38 of the second tube 35 is connected to the positive terminal of the biasing battery 29. The cathode 37 of this tube is connected, through a current-limiting resistor 41, to an intermediate tap 42 on the resistor 14 which carries a rectified and smoothed-out current proportional to the line-voltage. The grid-cathode voltage applied to the second tube 35 will thus respond to faults further out on the line than the balance point of the first tube 15, because a higher line-voltage is necessary in order that the effective portion of the voltage-drop in the resistor 14 may exactly balance the voltage-drop in the resistor 13.

A relay-contact 43 is also included in the cathode circuit of the second tube 35 for the purpose of interrupting the discharge when the fault has been cleared from the line, as will subsequently be described.

The anode 36 of the second tube 35 is connected to the positive terminal (+) of the plate battery or tripping battery 19. The cathode 37 of the second tube 35 is connected to the negative terminal (—) of the tripping battery 19 through a resistor 44 and the relay-contact 43.

When the second tube 35 breaks down, a substantial plate current is passed through the resistor 44 and some or all of the voltage thus developed in the resistor 44 is utilized for the purpose of charging a small capacitor 45, through a resistor 46, so that the capacitor begins to build up a charge at a rate which is dependent upon the amount of capacitance in the capacitor, the amount of resistance in the resistor 46, and the amount of voltage which is applied thereto from the resistor 44, the latter quantity being illustrated as being variable by means of a variable tap 47 on the resistor 44, although it will be understood that any one or all of the three quantities mentioned may be varied, in order to change the time required for the capacitor 45 to build up a predetermined positive charge.

The positive terminal of the capacitor 45 is connected, through a current-limiting resistor 48, to the grid 49 of a third grid-glow tube 51, and the negative terminal of the capacitor 45 is connected to the negative terminal (—) of the plate battery 19. This negative terminal (—) is also connected to the cathode 52 of the third tube 51 through the circuit-breaker contacts 21, the resistor 23 and the relay-coil 24. The anode 53 of the third tube 51 is connected to the positive terminal (+) of the battery 19.

It will thus be seen that the third tube 51 will break down only after a sufficient positive charge has accumulated on the capacitor 45, the time for this being adjusted as by adjusting the tap 47, and being of the order of some 10 cycles in an installation utilizing circuit-breakers capable of tripping in something like 8 cycles. When the third tube breaks down, it actuates the tripping-relay coil 24 which thereupon short-circuits the third tube through the relay-contacts 33 and energizes the circuit-breaker tripping-coil 4 through the relay-contacts 34.

In general, the first tube 15 will have a balance point within the line-section being protected, responding to the position of fault on the relay side of the far end of the line-section being protected, whereas the second tube 35 will respond to a position or distance of fault beyond the far end of the line-section.

It will be noted that nothing has been described to prevent either one of the two impedance-responsive tubes 15 and 35 from breaking down in response to faults back on the line to the left of the relaying station and bus 2, commonly called "power-out" or "external" faults because the power or current is flowing out of the protected line-section and the fault is located externally of said line-section, as well as in response to faults out on the line to the right of the relaying station and bus 2, on the side toward the line-section which is to be protected, commonly called "power-in" or "internal" faults. It will be further noted that nothing has been described to stop the discharge of the second impedance-tube 35 once it has been initiated. Both of these functions are provided for, by means of the hereinabove-described relay-contacts 30 and 43, which are operated in unison as a part of a relay 55 having an operating coil 56 and a third set of holding-in contacts 57. I shall call this relay 55, with the relay contacts 30, 43 and 57, a directional relay. When the directional-relay coil 56 is deenergized, the three relay-contacts are open, so that the relay-contact 30 prevents the actuation of the first impedance-tube 15, and the relay-contact 43 prevents the actuation of the second impedance-tube 35, or interrupts its discharge if it has started discharging.

It is desirable or necessary that the directional relay 55 shall be normally deenergized, and that it shall remain deenergized under all circumstances except when there is a fault somewhere on the transmission circuit to the right of the relaying station, that is, on the side of the relaying station in which the line to be protected is located. To this end, I may utilize a directional wattmetric element 58 which may be similar to that which is described and claimed in my application, Serial No. 654,662, filed February 1, 1933, for High-speed directional relay elements.

The wattmetric directional element 58 is essentially a wattmeter having a voltage-coil 59 which is energized across the secondary of the potential-transformer 6, and a current-coil 61 which is energized in series with the current-transformer 5. It is desirable that the wattmeter element 58 shall have its maximum response at a power-factor such as the poor power-factor which prevails during a fault, or at an intermediate power-factor between said fault power-factor and the power-factors obtainable during normal load conditions. In a three-phase transmission line this is readily accomplished by choosing voltage and current sources of such relative phases that the current leads the voltage by 30° when the line power-factor is 100%. For simplicity of illustration, however, I have illustrated my invention in connection with only a single phase, it being understood that the apparatus may be duplicated for other phases. The lagging of the voltage-response with respect to the current-response in the directional element 58 is obtained by reason of the reactance of the voltage-coil 59.

The wattmetric directional element 58 just described is extremely sensitive, and fast in its operation. It is provided with two sets of contacts 62 and 63, respectively. The wattmeter torque developed in the element 58 tends to close the contacts 62 when the current is flowing out of the protected line, toward the relaying station bus 2, indicating that there is no fault in or beyond the line-section which is being protected. When the currents are flowing into the line, from the relaying station, the wattmeter torque tends to close the contacts 63, particularly when the power-factor is very poor as in the case of fault conditions.

For the purposes of my present invention, I have found it desirable to modify the action of the simple wattmetric directional element just described, by adding means for positively preventing the contacts 63 from being closed except when there is an actual fault on the protected-line side of the relaying station; and this is accomplished, in the exemplary embodiment shown in the drawing, by means of a small, light, voltage-responsive solenoid 64 which is energized across the secondary terminals of the potential-transformer 6. The voltage-solenoid 64 prevents the actuation of the directional element 58, that is, it prevents the closure of the contacts 63, unless and until the line-voltage has been reduced by the presence of a fault, and simultaneously a fault-current flows into the line, away from the relaying station bus 2. The voltage-responsive preventive means 64 thus reduces the extreme sensitivity of the wattmetric directional element 58, only to the extent of enabling the directional element to certainly discriminate between fault-conditions and maximum-power normal conditions, while still leaving the directional element extremely sensitive as to fault conditions, so that the directional element will respond directionally to faults which are further away than the balance points of either of the impedance-tubes 15 or 35, so that the directional response will always be obtained, closing the contacts 30 and 43, whenever the impedance-tubes respond, provided that the direction of current-flow is away from the relaying station, or in the predetermined direction for which the directional element is set to operate.

The contacts 63 of the wattmetric directional element 58 are connected between the negative terminal (—) of the tripping battery 19 and the operating coil 56 of the directional relay 55, from which the circuit is completed, through a resistor 66, to the positive terminal (+) of the battery. When the directional-relay coil 56 is energized, it closes its several relay contacts 30, 43 and 57 as previously described, and the contact 57 completes a holding circuit from the negative battery terminal (—) to the relay-coil 56, which maintains the energization of the directional relay 55 until the wattmetric directional element 58 returns to its normal position and closes its contacts 62, which are arranged to short-circuit the relay-coil 56 and thus deenergize the relay.

It is desirable that the wattmetric directional element 58 shall promptly return to its normal position, closing the contacts 62 as shown in the drawing, as soon as the fault is cleared from the line 1. In many transmission systems to which my invention will be applied, the line-section will be provided with a sectionalizing circuit-interrupter similar to that shown at 3, at both ends of the line-section, so that it will be likely that the voltage-responsive restraining solenoid 64 of my directional element will be deenergized when the circuit breaker 3 which is controlled by the illustrated relaying station has completed its opening operation. In order to insure the return of the directional element to its normal position under such circumstances, some means, such as a very light spring 67, may be utilized for the purpose of biasing the element toward the position in which the contacts 62 are closed, thus interrupting the discharge of the second tube 35.

Figure 2:
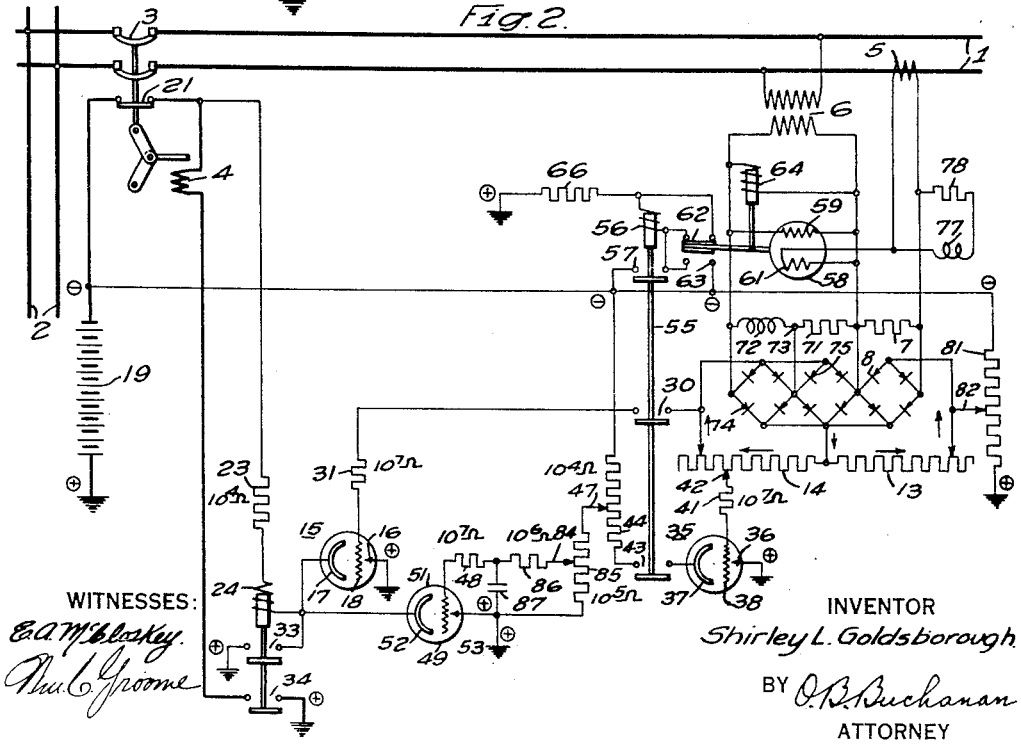

Fig. 2 shows a modification of the apparatus shown in Fig. 1, utilizing a split-phase circuit means for smoothing out the pulsations of the rectified voltage-component, instead of utilizing the filter 12. The split-phase effect is produced by means of a resistor 71 and an inductor 72 connected in series with each other across the secondary winding of the potential-transformer 6, so as to derive two voltages which are out of phase with each other, the same being tapped off, as indicated at 72, and applied to two rectifier-networks 74 and 75, respectively, to provide two sources of rectified currents, both proportional to the line-voltage, but having ripples which are out of phase with each other, said currents being combined so as to produce a fairly smooth-topped rectified current which is supplied to the resistor 14 previously described.

In the modification of my invention shown in Fig. 2, the rectified relaying currents which are responsive to the line-currents are not filtered, being applied directly to the resistor 13 without the intervention of the filter 9 of Fig. 1.

In Fig. 2, I have also shown the use of a transient shunt for the purpose of absorbing, from the current-responsive apparatus, the asymmetrical direct-current transient-component of the line-current which may occur when a sudden change is made in the impedance-characteristics of the line, as when a fault occurs. This transient shunt is composed of an inductance 77 and a resistance 78 connected in series with each other, in about the same proportion as the inductance and resistance of the line-impedance, and shunted across the current-responsive apparatus which is to be protected. It is necessary, for the success of this transient shunt, that the protected current-responsive apparatus shall have a resistance which is sufficiently large, compared to the inductance of the current-responsive circuit, to give this current-responsive circuit a very short time-constant as compared to the time constant of the transient shunt itself, and this is taken care of by making the previously described resistance 7 sufficiently large.

While the transient shunt is possibly more helpful in the Fig. 2 embodiment than in the Fig. 1 embodiment of my invention, because of the sluggishness of current-response introduced by the filter-circuit 9 in Fig. 1, it may nevertheless be utilized in either embodiment or it may be omitted from both embodiments. In general, a transient shunt is desirable when the speed of response is notably faster than one cycle, on most 60-cycle systems, because the error-introducing asymmetric transient on most 60-cycle transmission systems is of about that order of magnitude in its time of duration.

The transient-shunt protective system is described and claimed, in its general utilities, in an application of Leslie N. Crichton, Serial No. 422,965, filed January 23, 1930, for Relay systems.

In the embodiment of my invention shown in Fig. 2, I have also illustrated the utilization of a potentiometer 81 which is connected across the plate battery 19 and which is tapped off at an intermediate point 82 to provide the grid-biasing potential which is supplied in Fig. 1 by a separate biasing battery 29.

In Fig. 2, I have also illustrated the principle that the potential of the grid of any or all of the tubes may be controlled by controlling the potential of the grid with respect to the anode rather than by controlling the potential of the grid with respect to the cathode. This is accomplished in Fig. 2 by utilizing the negative voltage which is tapped off of the potentiometer 81 between the positive battery-terminal (+) and the tap 82, as a means for making each of the grids 18 and 38 of the two impedance-responsive tubes 15 and 35 critically negative with respect to the anodes 16 and 36, both of which are also connected to the same positive battery-terminals. The grids 18 and 38 are positive with respect to their cathodes 17 and 37, but less positive than the anodes, and not quite positive enough to initiate a glow discharge.

In this case, the line-voltage responsive biasing-voltage of the resistor 14 operates in the same direction as the negative bias introduced from the potentiometer 81, thus increasing the negative bias of the grids with respect to their anodes, and reducing the positive bias of the grids with respect to their cathodes. The line-current responsive biasing-voltage of the resistor 13 operates in the other direction, thus tending to initiate the discharge.

In Fig. 2, the grid 49 of the third or time-delay tube 51 is normally biased to a negative potential with respect to the anode 53, by means of a tap 84 on a potentiometer 85 which is connected between the positive battery-terminal or anode-lead (+) and the tap 47 on the resistor 44 which is connected between the second-tube 35 and the negative battery-terminal (—). The biasing voltage is applied to the third tube grid 49 through a circuit which may be traced from the potentiometer tap 84, and including a capacitor-charging resistor 86 and the protective current-limiting resistor 48. A biasing capacitor 87 is connected across the anode-grid circuit so as to include the protective resistor 48 in series with the grid.

Normally the second tube 35 is not discharging, so that it substantially open-circuits the positive end of the resistor 44. This resistor is considerably smaller in resistance than the potentiometer 85, so that the resistor tap 47, which is at the negative end of the potentiometer, is substantially at the potential of the negative battery-terminal (—). Under these conditions the grid 49 is made so strongly negative with respect to the anode 53 that the tube 51 cannot break down. The grid capacitor 87 assumes a corresponding negative potential.

When the second impedance-tube 35 breaks down, it discharges a substantial current through the resistor 44, thereby making the resistor-tap 47 more positive, and reducing the negative potential of the potentiometer-tap 84 with respect to the anode. The biasing capacitor 87 thereupon begins to change its charge at a rate dependent upon its capacitance, the value of the resistor 86, and the magnitude of voltage change of the potentiometer-tap 84. The shunt-connected grid 49 is thus gradually brought to a less negative potential with respect to the anode 53, or to a potential which is more positive with respect to the cathode 52, until the tube 51 finally breaks down.

The biasing of the grids with respect to their anodes, as in Fig. 2, rather than with respect to their cathodes, as in Fig. 1, is advantageous in avoiding the limitation of the Fig. 1 embodiment wherein the grid-cathode circuit must not have a bias greater than the critical glow-discharge potential of the tube, which is over 140 volts, lest the grid-cathode space form a glow discharge which is self-sustaining and which would not be interrupted either by an interruption of the anode-cathode circuit or by a slight reduction in grid potential. Fig. 2 therefore makes possible a wider range in the choice of grid voltages.

Except in the particulars hereinabove noted, the system shown in Fig. 2 is in its essential particulars substantially the same as the system shown in Fig. 1.

My present invention is more particularly concerned with apparatus for responding to the impedance of a transmission-line section to be protected, said apparatus being exemplified particularly in the tubes 15 and 35. The third tube 51 is essentially a time-delay relay and may be either of the tube type, as shown, or of a mechanical type. In like manner, the tripping relay 24 is merely an amplifying relay of any sort and may be of the mechanical type, as shown, or it may be a suitable amplifier tube, or it may be omitted altogether if a sufficiently large impedance-responsive tube is utilized to handle directly the currents required for quickly tripping the circuit breaker 3. In like manner, the directional relay 55 may be either a mechanical relay, as illustrated, or it may be any tube relay or combination of electric circuits and tubes for accomplishing the purposes herein described.

It will also be understood that I am not limited to any particular type of three-element tubes in my application although I have had particularly in mind the use of grid-glow tubes for this purpose, on account of certain inherent advantages of such tubes, including the advantage of an extremely small input, of the order of 1 microampere, making possible an enormous reduction in the volt-ampere requirements of the potential and current transformers which are needed to derive the line-voltage and the line-current respectively. To show the compactness of the apparatus embodying my invention, it may be mentioned that the particular grid-glow tube which I have in mind has a diameter of $2\frac{3}{16}$ inches and a height of bulb of about 4 inches. It takes a grid current, at the breakdown point, of the order of 0.01 to 3.0 microamperes. Its plate current, or current in the anode-cathode circuit, is of the order of 0.01 to 0.1 ampere. It may be operated on a plate voltage of the order of two or three hundred volts, which may be increased up to a maximum of about eight hundred volts.

In order to facilitate the tracing of the circuits and the distinction between currents of different orders of magnitude, the orders of magnitude of the various current-limiting resistors have been indicated, in Figs. 1 and 2, as suggestive of the different orders of magnitude involved, without limiting myself to any particular size of tube or any particular resistance in the various circuits.

While I have illustrated my invention in two preferred forms of embodiment, it is obvious that many substitutions of elements, and changes in detail, may be resorted to without departing from the novel relaying principles which I have herein described. I desire, therefore, that the appended claims shall be accorded the broadest construction consistent with their language and prior art.

I claim as my invention:

1. An electron-tube impedance relay for responding to an impedance quantity of an alternating-current line, comprising, in combination, a three-element electron tube comprising an anode, a cathode and a control electrode, means for deriving a unidirectional relaying voltage responsive mainly to the line-voltage, means for deriving a unidirectional relaying current responsive mainly to the line-current, a plate-voltage source for the tube, a unidirectional biasing-voltage source for the control electrode of the tube, a plate-current-responsive means for performing a desired function in response to a predetermined change in the magnitude of the plate-current flowing in the anode-cathode circuit of said tube, the biasing-voltage source being of a magnitude close to, but slightly different from, the critical value at which said predetermined change in magnitude of plate-current will occur, means for deriving opposing biasing-circuit voltages from said relaying voltage and said relaying current, and means for so combining said derived biasing-circuit voltages with said biasing-voltage source as to produce said critical value of biasing voltage for conditions corresponding to a fault out on the line at a point slightly nearer than the balance-point of the relay, but not for conditions corresponding to a fault out on the line at a point slightly beyond said balance-point.

2. An electron-tube impedance relay for responding to an impedance quantity of an alternating-current line, comprising, in combination, a three-element electron tube comprising an anode, a cathode and a control electrode, means for deriving a substantially non-pulsatory unidirectional relaying voltage responsive mainly to the line-voltage, means for deriving a second unidirectional relaying voltage responsive mainly to the line-current, a plate-voltage source for the tube, a unidirectional biasing-voltage source for the control electrode of the tube, a plate-current-responsive means for performing a desired function in response to a predetermined change in the magnitude of the plate-current flowing in the anode-cathode circuit of said tube, the biasing-voltage source being of a magnitude close to, but slightly different from, the critical value at which said predetermined change in magnitude of plate-current will occur, and means for so combining said two relaying voltages in opposition to each other and in combination with said biasing-voltage source as to produce said critical value of biasing voltage for conditions corresponding to a fault out on the line at a point slightly nearer than the balance-point of the relay, but not for conditions corresponding to a fault out on the line at a point slightly beyond said balance-point.

3. An electron-tube impedance relay for responding to an impedance quantity of an alternating-current line, comprising, in combination, a three-element electron tube comprising an anode, a cathode and a control electrode, means for deriving a substantially non-pulsatory unidirectional relaying voltage responsive mainly to the line-voltage, means for deriving a second substantially non-pulsatory unidirectional relaying voltage responsive mainly to the line-current, a plate-voltage source for the tube, a unidirectional biasing-voltage source for the control electrode of the tube, a plate-current-responsive means for performing a desired function in response to a predetermined change in the magnitude of the plate-current flowing in the anode-cathode circuit of said tube, the biasing-voltage source being of a magnitude close to, but slightly different from, the critical value at which said predetermined change in magnitude of plate-current will occur, and means for so combining said two relaying voltages in opposition to each other and in combination with said biasing-voltage source as to produce said critical value of biasing voltage for conditions corresponding to a fault out on the line at a point slightly nearer than the balance-point of the relay, but not for conditions corresponding to a fault out on the line at a point slightly beyond said balance-point.

4. The invention as defined in claim 2, characterized by said line-voltage-responsive relaying-voltage means comprising a plurality of out-of-phase alternating-current voltage circuits and rectifier means associated with each of said circuits.

5. The invention as defined in claim 3, characterized by each of said relaying-voltage means comprising rectifier-means and filter-means.

6. An electron-tube impedance relay for responding to an impedance quantity of an alternating current line, comprising, in combination, two similar three-element electron tubes, each comprising an anode, a cathode and a control electrode, means for deriving a substantially non-pulsatory unidirectional relaying voltage responsive mainly to the line-voltage, means for deriving a second unidirectional relaying voltage responsive mainly to the line-current, a common plate-voltage source for the two tubes, a common unidirectional biasing-voltage source for the control electrodes of the two tubes, a plate-current-responsive means for performing a desired function in response to a predetermined change in the magnitude of the plate-current flowing in the anode-cathode circuit of each tube, the biasing-voltage source being of a magnitude close to, but slightly different from, the critical value at which said predetermined change in magnitude of plate-current will occur, a first resistor connected in series circuit relation to said biasing-voltage source, a second resistor connected in series circuit relation to said first resistor, means for connecting said serially connected biasing-voltage source and resistors between the control electrode and one of the other electrodes of one of the tubes, means for connecting said serially connected biasing-voltage source, first resistor, and less than all of said second resistor between the control electrode and one of the other electrodes of the other tube, and means for causing oppositely directed resistor-currents to flow through the respective resistors, one of said resistor-currents being generated by said line-voltage-responsive relaying voltage, and the other of said resistor-currents being generated by said line-current-responsive relaying voltage, the relative directions and values of the resistor-currents being such as to produce said critical value of biasing voltage for conditions corresponding to a fault out on the line at a point slightly nearer than the balance-point of each relay, but not for conditions corresponding to a fault out on the line at a point slightly beyond said balance-point.

7. An electron-tube impedance relay for responding to an impedance quantity of an alternating-current line, comprising, in combination, two similar three-element electron tubes, each comprising an anode, a cathode and a control electrode, means for deriving a substantially non-pulsatory unidirectional relaying voltage responsive mainly to the line-voltage, means for deriving a second unidirectional relaying voltage responsive mainly to the line-current, plate-voltage means for the two tubes, unidirectional biasing-voltage means for the control electrodes of the two tubes, a plate-current-responsive means for performing a desired function in response to a predetermined change in the magnitude of the plate-current flowing in the anode-cathode circuit of each tube, the biasing-voltage means being of a magnitude close to, but slightly different from, the critical value at which said predetermined change in magnitude of plate-current will occur, a potentiometer associated with one of said relaying voltages, means for serially connecting the other relaying voltage in series relation to the biasing-voltage source and in series relation to said potentiometer for controlling the potentials of the control electrodes of the respective tubes, said control electrodes receiving voltages from different taps of said potentiometer, the two relaying voltages being oppositely directed and so related as to produce said critical value of biasing voltage for conditions corresponding to a fault out on the line at a point slightly nearer than the balance-point of each relay, but not for conditions corresponding to a fault out on the line at a point slightly beyond said balance-point.

8. In a protective system, an alternating-current electric circuit, a circuit-interrupter therefor, a three-element electron tube comprising an anode, a cathode and a control electrode, a plate-voltage source for the tube, a unidirectional biasing-voltage source for the control electrode of the tube, a plate-current-responsive means for effecting the opening of said circuit-interrupter in response to a predetermined change in the magnitude of the plate-current flowing in the anode-cathode circuit of said tube, the biasing-voltage source being of a magnitude close to, but slightly different from, the critical value at which said predetermined change in magnitude of plate-current will occur, line-circuit-responsive means for deriving the difference between rectified voltage and current components for so changing the biasing voltage as to produce said critical value of biasing voltage for conditions corresponding to a fault out on the line at a point slightly nearer than the balance-point of the relay, but not for conditions corresponding to a fault out on the line at a point slightly beyond said balance-point, and directional-relay means normally operative to prevent the application of said critical value of biasing voltage to said control electrode, said directional-relay means comprising a directional wattmetric element tending to remain in normal position when the line-current is flowing out of the line and tending to move to actuated position when the line-current is flowing into the line, and a voltage-responsive restraining element tending at all times to oppose the movement of the directional element to actuated position, and being overcome by said directional element only upon the occurrence of fault conditions.

9. In a protective system, an alternating-current electric circuit comprising a line-section to be protected, a circuit-interrupter therefor, directional-relay means normally operative to prevent the opening of said circuit-interrupter, said directional-relay means comprising a directional wattmetric element tending to remain in normal position when the line-current is flowing out of the line and tending to move to actuated position when the line-current is flowing into the line, and a voltage-responsive restraining element tending at all times to oppose the movement of the directional element to actuated position, and being overcome by said directional element only upon the occurrence of fault conditions, additional relay means associated with said directional-relay means, said additional means being normally operative to prevent the opening of said circuit-interrupter and being operative to actuated position in response to a position of fault on the relay side of the far end of the line-section being protected, and means responsive to the simultaneous actuation of both relay means for effecting the opening of the circuit-interrupter.

10. In a protective system, an alternating-current electric line, a circuit-interrupter therefor, an electron-tube impedance relay means for responding to an impedance quantity of said alternating-current line, a directional relay means, and control-circuit means for controlling said circuit-interrupter in response to said impedance and directional relay means; characterized by said impedance relay means including a three-element electron tube comprising an anode, a cathode and a control electrode, means for deriving a unidirectional relaying voltage responsive mainly to the line-voltage, means for deriving a unidirectional relaying current responsive mainly to the line-current, a plate-voltage source for the tube, a plate-current-responsive means for performing a desired function in response to a predetermined large, discontinuous change in the magnitude of the plate-current flowing in the anode-cathode circuit of said tube, means for deriving opposing biasing-circuit voltages from said relaying voltage and said relaying current, and means for applying said opposing biasing-circuit voltages for the control of said control electrode, the tube being of such character, and being normally so adjusted, that a slight excess of the line-current-responsive biasing-circuit voltage over the line-voltage-responsive biasing-circuit voltage will produce said predetermined large, discontinuous change in the magnitude of the plate-current; and said directional relay means including means for normally remaining in, and returning to, an unactuated position and for moving to an actuated position only when there is a fault in said alternating-current line, accompanied by fault-current flowing in a predetermined direction, and not so moving during normal line conditions, said directional relay means being sufficiently sensitive to respond directionally to faults further away, in said predetermined direction, than the balance-point corresponding to the impedance quantity at which said impedance relay means responds; and said control-circuit means including means for safeguarding against said large plate-current when said directional relay means is in its unactuated position.

11. In a protective system, an alternating-current electric line, a circuit-interrupter therefor, an electron-tube impedance relay means for responding to an impedance quantity of said alternating-current line, a directional relay means, and control-circuit means for controlling said circuit-interrupter in response to said impedance and directional relay means; characterized by said impedance relay means including a three-element electron tube comprising an anode, a cathode and a control electrode, means for deriving a substantially non-pulsating unidirectional relaying voltage responsive mainly to the line-voltage, means for deriving a relaying voltage responsive mainly to the line-current, a plate-voltage source for the tube, a plate-current-responsive means for performing a desired function in response to a predetermined large, discontinuous change in the magnitude of the plate-current flowing in the anode-cathode circuit of said tube, and means for combining said two relaying voltages in opposition to each other and for applying said opposing voltages for the control of said control electrode, the tube being of such character, and being normally so adjusted, that a slight excess of the line-current-responsive relaying voltage over the line-voltage-responsive relaying voltage will produce said predetermined large, discontinuous change in the magnitude of the plate-current; and said directional relay means including means for normally remaining in, and returning to, an unactuated position and for moving to an actuated position only when there is a fault in said alternating-current line, accompanied by fault-current flowing into a particular line-section being protected, and not so moving during normal line conditions, said directional relay means being sufficiently sensitive to respond directionally to faults further away, in said predetermined direction, than the balance-point corresponding to the impedance quantity at which said impedance relay means responds; and said control-circuit means including means for safeguarding against said large plate-current when said directional relay means is in its unactuated position.

12. The invention as defined in claim 11, characterized by said control-circuit safeguarding means operating in the control of the control electrode of said tube.

13. The invention as defined in claim 11, characterized by said control-circuit safeguarding means operating in the plate circuit of said tube.

14. In a protective system, an electric line to be protected, a circuit-interrupter therefor, two three-element electron tubes each comprising an anode, a cathode and a control electrode, means for developing two opposed direct-current voltages proportional respectively to line-current and line-voltage so as to produce a separate resultant differential control-circuit voltage for the control electrode of each tube, the relative values of line-current and line-voltage at which said resultant differential control-circuit voltage becomes zero being different for the two tubes, means for applying the resultant differential control-circuit voltages for the control of the respective control electrodes, the tubes being of such character that a slight excess of line-current-responsive control-circuit voltage over the line-voltage-responsive control-circuit voltage will produce a predetermined change in the anode-cathode currents in the respective tubes, one tube responding to more remote faults than the other, means associated with the tube responsive to nearer faults for utilizing said predetermined change in the anode-cathode current in a quick-acting control of said circuit-interrupter, means associated with the tube responsive to further faults for utilizing said predetermined change in the anode-cathode current in a slowly-acting control of said circuit-interrupter, so that the latter is actuated only after a predetermined time-delay in response to said slowly-acting control, and means for locking out both of said tubes except upon the occurrence of a fault on the protected-line side of the installation and for ensuring the restoration of both tubes to normal condition upon the cessation of the fault condition which actuated the tubes.

15. An electron-tube impedance relay for responding to an impedance quantity of an alternating-current line, comprising, in combination, two similar three-element electron tubes, each comprising an anode, a cathode and a control electrode, means for deriving a substantially non-pulsatory unidirectional relaying voltage responsive mainly to the line-voltage, means for deriving a second unidirectional relaying voltage responsive mainly to the line-current, plate-voltage means for the two tubes, a plate-current-responsive means for performing a desired function in response to a predetermined change in the magnitude of the plate-current flowing in the anode-cathode circuit of each tube, a first resistor, a second resistor connected in series circuit relation to said first resistor, means for connecting said serially connected resistors between the control electrode and one of the other electrodes of one of the tubes, means for connecting said serially connected first resistor, and less than all of said second resistor between the control electrode and one of the other electrodes of the other tube, and means for causing oppositely directed resistor-currents to flow through the respective resistors, one of said resistor-currents being generated by said line-voltage-responsive relaying voltage, and the other of said resistor-currents being generated by said line-current-responsive relaying voltage, the relative directions and values of the resistor-currents being such as to produce a critical value of biasing voltage for conditions corresponding to a fault out on the line at a point slightly nearer than the balance-point of each relay, but not for conditions corresponding to a fault out on the line at a point slightly beyond said balance-point.

16. In a protective system, an alternating-current electric line, circuit-interrupter means therefor, and quick acting and time-delay fault-responsive protective relaying means for controlling said circuit-interrupter means; characterized by said time-delay fault-responsive protective relaying means including an impedance-relay means for developing two opposed direct-current voltages proportional respectively to rectified voltage and rectified current of the line, an electron tube comprising an anode, a cathode and a control electrode, means for applying said opposed relaying voltages for the control of said control electrode, and time-delay means for responding to the resultant changes in the current in the anode-cathode circuit, said tube being of such type, and being normally so adjusted, that it will suddenly spill over at some critical value of the control-electrode voltage, so that the anode current thereupon changes from a relatively small value to a relatively large value and the control electrode thereafter loses control over the anode current as long as said anode current is flowing, and directional-relay means normally operative to open-circuit the anode-cathode circuit of said tube, except in the presence of fault-current, as distinguished from normal power current, flowing in a predetermined direction in the alternating-current electric line.

17. In a protective system, an alternating-current electric circuit, a circuit-interrupter therefor, a three-element electron tube comprising an anode, a cathode and a control electrode, a plate-voltage source for the tube, a unidirectional biasing-voltage source for the control electrode of the tube, a plate-current-responsive means for effecting the opening of said circuit-interrupter in response to a predetermined change in the magnitude of the plate-current flowing in the anode-cathode circuit of said tube, the biasing-voltage source being of a magnitude close to, but slightly different from, the critical value at which said predetermined change in magnitude of plate-current will occur, line-circuit-responsive means for deriving the difference between rectified voltage and current components for so changing the biasing voltage as to produce said critical value of biasing voltage for conditions corresponding to a fault out on the line at a point slightly nearer than the balance-point of the relay, but not for conditions corresponding to a fault out on the line at a point slightly beyond said balance-point, and directional-relay means normally operative to prevent the application of said critical value of biasing voltage to said control electrode, except in the presence of fault-current flowing into the protected line.

18. In a protective system, an alternating-current electric circuit, a circuit interrupter therefor, an electron-tube impedance relay for responding to an impedance quantity of an alternating-current line, comprising, in combination, means for developing two opposed direct-current voltages proportional respectively to rectified voltage and rectified current of the line, a tube comprising an anode, a cathode and a control electrode, means for applying said opposed relaying voltages for the control of said control electrode, and means for responding to the resultant changes in the current in the anode-cathode circuit, and directional-relay means normally operated to prevent the effectual application of said opposed relaying voltages for the control of said control electrode, except in the presence of an actual fault on the alternating-current circuit, with the fault-current flowing in a predetermined direction with respect to the protected line, characterized by the fact that said tube is of such type, and is normally so adjusted, that it will suddenly spill over at some critical value of the control-electrode voltage, so that the anode current thereupon changes from a relatively small value to a relatively large value and the control electrode thereafter loses control over the anode current as long as said anode current is flowing.

19. In a high-speed, highly selective, protective system, means for responding to a predetermined direction of current-flow, coupled with a predetermined fault-condition, in an electric transmission line, said means comprising, in combination, a tube having an output-circuit, a source of energization for said output-circuit, and control-circuit means for controlling the space-current conditions, within the tube, in said output-circuit, the tube being of such character that, at a certain critical condition of the control-circuit means, the output-circuit current will make a large, discontinuous change from a relatively small value to a relatively large value in response to a very slight change in the control-circuit condition, transmission-line-responsive means for energizing said control-circuit means in response to some predetermined fault condition of said transmission line whereby said critical control-circuit condition is obtained in the tube at said predetermined fault-condition in the transmission line, directional means responsive only to fault-conditions, and not to normal conditions, in said electric transmission line, and responsive only to a predetermined direction of fault-current flow in said transmission line, for preventing said control-circuit conditions in the tube from reaching said critical state, at said predetermined fault-condition in the transmission line, when the transmission-line current-flow is not in said predetermined direction, whereby the output-circuit current of the tube maintains its relatively small value under said conditions, said directional means also operating, in response to said predetermined direction of fault-current flow in the transmission line, to so change the control-circuit conditions in the tube that the output-circuit current makes said large, discontinuous change in response to a very slight change in the control-circuit condition of the tube at said predetermined fault-condition in the transmission line, and non-sensitively adjusted means responsive to said large, discontinuous change in said output-circuit current, whereby the selectivity of the protective operation, discriminating as to whether a protective-circuit response shall, or shall not, be made, is obtained by the space-current conditions within the tube.

20. In a high-speed, highly selective, protective system, means for responding to a predetermined abnormal operating condition in an electric transmission line, said means comprising, in combination, a tube having an output-circuit, a source of energization for said output-circuit, and control-circuit means for controlling the space-current conditions, within the tube, in said output-circuit, the tube being of such character that, at a certain critical condition of the control-circuit means, the output-circuit current will make a large, discontinuous change from a relatively small value to a relatively large value in response to a very slight change in the control-circuit condition, means, responsive to the line-current, tending to cause the control-circuit means to attain said critical condition in the tube when the line-current increases from normal values to said predetermined abnormal operating condition in the transmission line, unidirectional-current means, responsive to the line-voltage, for opposing the attainment of said critical condition in the control-circuit means of the tube, the adjustments of said tube and of said current- and voltage-responsive means being such that said critical control-circuit condition is obtained in the tube at said predetermined abnormal operating condition in the transmission line, directional-relay means normally operative to safeguard against said large output-circuit current except in the presence of fault-current, as distinguished from normal power current, flowing into the transmission line being protected, and non-sensitively adjusted means responsive to said large, discontinuous change in said output-circuit current, whereby the selectivity of the protective operation, discriminating as to whether a protective circuit response shall, or shall not, be made, is obtained by the space-current conditions within the tube.

SHIRLEY L. GOLDSBOROUGH.